(12) United States Patent
Liu et al.

(10) Patent No.: US 12,277,686 B2
(45) Date of Patent: Apr. 15, 2025

(54) METHOD AND DEVICE FOR PROCESSING IMAGE, METHOD FOR TRAINING IMAGE PROCESSING MODEL, AND STORAGE MEDIUM

(71) Applicant: BOE Technology Group Co., Ltd., Beijing (CN)

(72) Inventors: Hanwen Liu, Beijing (CN); Tingting Wang, Beijing (CN); Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 236 days.

(21) Appl. No.: 17/774,610

(22) PCT Filed: May 14, 2021

(86) PCT No.: PCT/CN2021/093940
§ 371 (c)(1),
(2) Date: May 5, 2022

(87) PCT Pub. No.: WO2021/233232
PCT Pub. Date: Nov. 25, 2021

(65) Prior Publication Data
US 2023/0069654 A1 Mar. 2, 2023

(30) Foreign Application Priority Data
May 18, 2020 (CN) .......................... 202010421169.X

(51) Int. Cl.
*G06T 5/70* (2024.01)

(52) U.S. Cl.
CPC ...... *G06T 5/70* (2024.01); *G06T 2207/20081* (2013.01)

(58) Field of Classification Search
CPC ...................................................... G06T 5/70
See application file for complete search history.

(56) References Cited

U.S. PATENT DOCUMENTS

| | | | | |
|---|---|---|---|---|
| 6,600,837 B1 * | 7/2003 | Shimura | ................. | G06T 9/005 |
| | | | | 382/239 |
| 11,645,735 B2 * | 5/2023 | Liu | ........................... | G06T 5/20 |
| | | | | 382/155 |
| 2018/0293706 A1 * | 10/2018 | Viswanathan | ........ | G06T 3/4046 |
| 2019/0196051 A1 * | 6/2019 | Wang | ..................... | G01N 23/04 |
| 2020/0349680 A1 * | 11/2020 | Tao | ............................ | G06T 5/73 |
| 2021/0019917 A1 * | 1/2021 | Ariizumi | .............. | G06V 10/764 |

(Continued)

FOREIGN PATENT DOCUMENTS

| | | |
|---|---|---|
| CN | 105046672 A | 11/2015 |
| CN | 105405106 A | 3/2016 |
| CN | 109285119 A * | 1/2019 |

(Continued)

*Primary Examiner* — Ted W Barnes
(74) *Attorney, Agent, or Firm* — IPro, PLLC

(57) ABSTRACT

Provided is a method for processing an image. The method includes: acquiring a first original image to be processed; and acquiring a degraded image by performing down-sampling processing and blurring processing on the first original image according to a configured down-sampling processing algorithm and a blurring parameter; wherein the down-sampling processing algorithm includes a plurality of sampling steps.

17 Claims, 7 Drawing Sheets

(56) References Cited

U.S. PATENT DOCUMENTS

2021/0157952 A1* 5/2021 Veloso ..................... G06N 5/04
2021/0312591 A1* 10/2021 Ren ....................... G06T 3/4053

FOREIGN PATENT DOCUMENTS

| CN | 110503611 | A |   | 11/2019 |             |
|----|-----------|---|---|---------|-------------|
| CN | 110766153 | A | * | 2/2020  |             |
| CN | 111105375 | A |   | 5/2020  |             |
| CN | 111127328 | A | * | 5/2020  |             |
| CN | 108475414 | B | * | 9/2020  | G06T 3/40   |
| CN | 112541873 | A | * | 3/2021  | G06T 5/20   |
| CN | 111491095 | B | * | 8/2021  | H04N 5/23232|
| CN | 110070494 | B | * | 9/2021  | G06T 5/002  |
| CN | 108765271 | B | * | 6/2022  | G06T 3/0012 |
| CN | 111105375 | B | * | 8/2023  | G06T 5/005  |
| CN | 111507333 | B | * | 9/2023  | G06F 18/214 |
| WO | WO-2017144881 | A1 | * | 8/2017 | G06T 3/4053 |
| WO | WO-2021013139 | A1 | * | 1/2021 | G06T 5/002  |

\* cited by examiner

METHOD AND DEVICE FOR PROCESSING IMAGE, METHOD FOR TRAINING IMAGE PROCESSING MODEL, AND STORAGE MEDIUM

CROSS-REFERENCE TO RELATED APPLICATION

This application is a U.S. national phase application based on PCT/CN2021/093940, filed on May 14, 2021, which is based on and claims priority to Chinese Patent Application No. 202010421169.X, filed on May 18, 2020 and entitled "METHOD FOR PROCESSING IMAGE AND METHOD FOR TRAINING IMAGE PROCESSING MODEL", all of which are hereby incorporated by reference in their entireties for all purposes.

TECHNICAL FIELD

The present disclosure relates to the field of digital image processing technologies, and in particular, relates to a method for processing an image and a method and apparatus for training an image processing model.

BACKGROUND

Using machine learning for image processing is always an important way of image processing and is also a hot technology that has developed very rapidly in recent years.

In response to using machine learning-based methods for image processing, pairs of images are generally required as training samples (training sets). At present, the acquisition method of training samples is mainly as follows: under the same external conditions (scene, time, location, shooting angle, and the like.), different devices are adopted to shoot a set of images (including high-quality high-resolution images and low-quality low-resolution images, wherein high and low are relative concepts), and then training samples are acquired through a small amount of post-processing (such as image alignment, cropping, and the like).

SUMMARY

The present disclosure provides a method for processing an image, and a method and apparatus for training an image processing model.

In a first aspect, embodiments of the present disclosure provide a method for processing an image. The method includes:
acquiring a first original image to be processed; and
acquiring a degraded image by performing down-sampling processing and blurring processing on the first original image according to a configured down-sampling processing algorithm and a blurring parameter; wherein the down-sampling processing algorithm includes a plurality of sampling steps.

In a second aspect, embodiments of the present disclosure provide a method for training an image processing model. The method includes:
training the image processing model by using a plurality of first original images and a plurality of degraded images corresponding to the plurality of first original images as a training data set, to enable a loss function of the image processing model to converge;
wherein the degraded images are acquired by processing the first original images according to the method for processing the image as described in the first aspect of the embodiments of the present disclosure.

In a third aspect, embodiments of the present disclosure provide a method for processing an image. The method includes:
acquiring a second original image to be processed; and
acquiring a processed image output by an image processing model by inputting the second original image into the image processing model; wherein the image processing model is acquired by training according to the method for training the image processing model as described in the second aspect of the embodiments of the present disclosure.

In a fourth aspect, embodiments of the present disclosure provide a device for processing an image. The device includes:
a memory; and
a processor electrically connected to the memory, wherein the memory stores a computer program executed by the processor to perform at least one of the method for processing the image as described in the first aspect of the embodiments of the present disclosure, the method for training the image processing model as described in the second aspect of the embodiments of the present disclosure, and the method for processing the image as described in the third aspect of the embodiments of the present disclosure.

In a fifth aspect, embodiments of the present disclosure provide a computer-readable storage medium storing a computer program, wherein the computer program, when executed by a processor, performs at least one of the method for processing the image as described in the first aspect of the embodiments of the present disclosure, the method for training the image processing model as described in the second aspect of the embodiments of the present disclosure, and the method for processing the image as described in the third aspect of the embodiments of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings, wherein.

DETAILED DESCRIPTION

Figure 1:
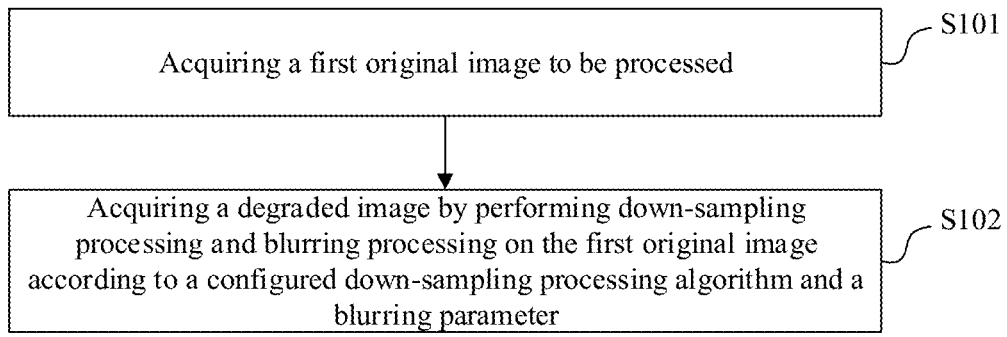
FIG. 1 is a schematic flowchart of a method for processing an image according to an embodiment of the present disclosure.

The present disclosure is described in detail below, and examples of embodiments of the present disclosure are illustrated in the accompanying drawings, wherein the same or similar reference numerals refer to the same or similar parts or parts having the same or similar functions throughout. Also, detailed descriptions of known technologies are omitted in the case that they are not necessary to illustrate features of the present disclosure. The embodiments described below with reference to the accompanying drawings are exemplary and are only intended to explain the present disclosure, but not to be construed as a limitation of the present disclosure.

It will be understood by those of ordinary skill in the art that, unless otherwise defined, all terms (including technical and scientific terms) used herein have the same meaning as commonly understood by one of ordinary skill in the art to which the present disclosure belongs. It should also be understood that terms, such as those defined in a general dictionary, should be understood to have meanings consistent with their meanings in the context of the prior art and, unless specifically defined as herein, should not be interpreted in idealistic or overly formal meaning to explain.

It will be understood by those skilled in the art that the singular forms "a," "an," "said," and "the" as used herein can include the plural forms as well, unless expressly stated otherwise. It should be further understood that the word "including" used in the description of the present disclosure refers to the presence of the stated features, integers, steps, operations, elements, and/or components, but does not preclude the presence or addition of one or more other features, integers, steps, operations, elements, components and/or groups thereof. It will be understood that when we refer to an element as being "connected" or "coupled" to another element, it may be directly connected or coupled to the other element or intervening elements may also be present. Furthermore, "connected" or "coupled" as used herein may include wirelessly connected or wirelessly coupled. As used herein, the term "and/or" includes all or any element and all combination of one or more of the associated listed items.

When the machine learning technology is applied to the processing of old photos, the training samples generally need to contain new photos with high quality and high resolution and corresponding old photos with low quality and low resolution. However, due to the specific meaning of old photos, it is no longer possible to acquire training samples by shooting, such that the application of machine learning in the field of old photo processing technology is greatly restricted.

The technical solutions of the present disclosure and how the technical solutions of the present disclosure solve the above technical problems will be described in detail below with specific embodiments.

An embodiment of the present disclosure provides an image processing method, which can be applied to a device for processing an image. The device for processing the image can be a device with an image processing function, such as a computer or a server. As shown in FIG. 1, the method for processing the image includes the following steps.

In S101, a first original image to be processed is acquired.

The first original image is a high-quality and high-resolution image. The first original image may be pre-stored in the device for processing the image. For example, the first original image may be an image captured by the device for processing the image, or may be an image captured by another device and then transmitted to the device for processing the image.

The image quality may be characterized by the definition. The higher the definition, the higher the image quality. High quality means high definition.

In S102, a degraded image is acquired by performing down-sampling processing and blurring processing on the first original image according to a configured down-sampling processing algorithm and a blurring parameter.

The down-sampling processing algorithm may include a plurality of sampling steps. A sampling magnification of each of the sampling steps may be greater than 0 and less than 1. Performing down-sampling processing on the first original image through a plurality of sampling steps can ensure that the acquired degraded image can approximate the effect of an old photo as much as possible. The blurring processing may be Gaussian blurring, or may also be other blurring processing, such as average blurring, median blurring, bilateral blurring, and the like.

It can be understood that performing down-sampling processing on the first original image can reduce the resolution of the first original image, and performing blurring processing on the first original image can reduce the definition of the first original image. Therefore, the degraded image acquired based on the above step 102 may be a low-quality and low-resolution image, and the degraded image has the effect of approximating an old photo.

It can also be understood that the execution order of the down-sampling processing and the blurring in the above S102 may be adjusted according to the situation. For example, the down-sampling processing may be performed on the first original image first, and the blurring processing may be performed thereon subsequently. Since the down-sampling processing can delete some pixels in the first original image to reduce the resolution of the image, performing the down-sampling processing first can ensure a small amount of computation in the subsequent blurring processing. In addition, the effect of the blurring processing being affected by the operation of the down-sampling processing due to the blurring processing being performed first and the down-sampling processing being performed subsequently can be avoided.

In summary, an embodiment of the present disclosure provides a method for processing an image, which can perform down-sampling processing and blurring processing on an original image to acquire a degraded image that approximates the effect of an old photo. Furthermore, the mathematical relationship between the old photo and the new photo can be established to provide a good training sample for the application of machine learning in the old photo restoration technology. An image processing model with strong restoration can be acquired by training an image processing model applied to the old photo restoration technology based on the training sample, and when an old photo is restored by using the image processing model, the restoration efficiency is high and the restoration effect is good.

Figure 2:
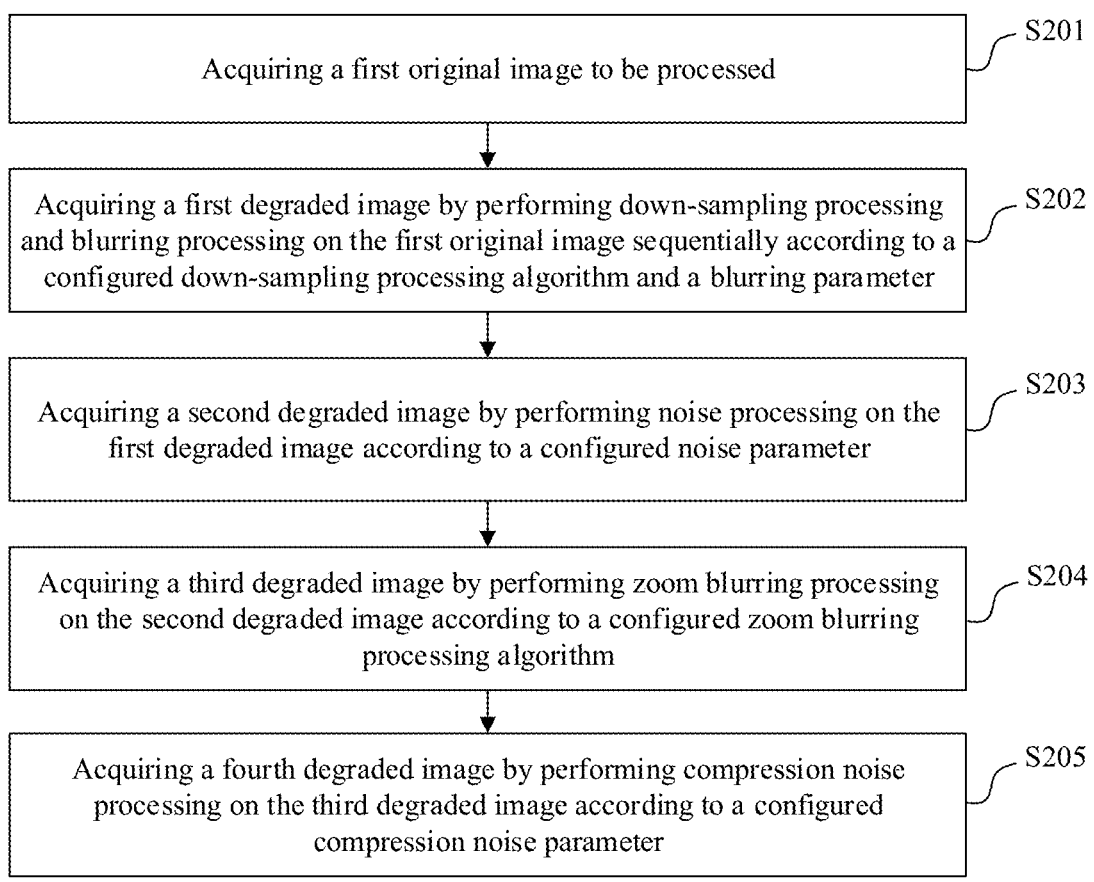
FIG. 2 is a schematic flowchart of another method for processing an image according to an embodiment of the present disclosure.

An embodiment of the present disclosure provides another method for processing an image, which is applied to a device for processing an image. The device for processing the image may be a device with an image processing function, such as a computer or a server. As shown in FIG. 2, the method for processing the image includes the following steps.

S201, a first original image to be processed is acquired.

Optionally, the first original image is a high-quality and high-resolution image. The first original image may be pre-stored in the device for processing the image. For example, the first original image may be an image captured by the device for processing the image, or may be an image captured by another device and then transmitted to the device for processing the image.

In an optional embodiment, high (high quality or high resolution) and low (low quality or low resolution) are relative concepts. The first original image is of high quality and high resolution relative to the processed image, that is, the image quality and resolution of the first original image are higher than the image quality and resolution of the processed image, respectively. The image quality may be characterized by the definition. The higher the definition, the higher the image quality. High quality means high definition.

In another optional embodiment, high and low may be determined based on a preset threshold or a reference value commonly used in the art or customized. For the preset threshold, being above the preset threshold is high, and being below the preset threshold is low. For the reference value, in an example, a resolution of 512×512 may be used as a high resolution, and a resolution of 64×64 may be used as a low resolution.

S202, a first degraded image is acquired by performing down-sampling processing and blurring processing sequentially on the first original image according to a configured down-sampling processing algorithm and a blurring parameter.

The down-sampling processing algorithm may also be referred to as a down-sampling processing path, the blurring processing may be Gaussian blurring processing, and the blurring parameter is a Gaussian blurring parameter. Correspondingly, S202 may acquire a first degraded image by performing down-sampling processing and Gaussian blurring processing sequentially on the first original image according to a configured down-sampling processing path and Gaussian blurring parameter.

In the embodiments of the present disclosure, the down-sampling processing path may include a plurality of sampling steps, and the Gaussian blurring parameter includes a Gaussian kernel size, a horizontal variance, and a vertical variance.

Optionally, the down-sampling processing path may include at least two of the following three sampling steps: a Bicubic (bicubic interpolation algorithm) algorithm-based sampling step, a Bilinear (bilinear interpolation algorithm) algorithm-based sampling step, and a Lanczos algorithm-based sampling step. A sampling magnification of each of the sampling steps in the down-sampling processing path is within a first magnification range. The first magnification range may be determined based on actual requirements or empirical values. An upper limit of the first magnification range may be less than or equal to 1. For example, the first magnification range may be set to a range greater than 0 and less than 1.

It should be understood that a sampling step may adjust a side length of an image on the premise of keeping an aspect ratio of the image unchanged, and the degree of adjustment of the side length of the image is determined by a sampling magnification of the sampling step. The sampling magnification of the sampling step in the embodiments of the present disclosure may refer to a ratio of a side length of the down-sampling-processed image to the original side length. For example, after an image is processed based on a sampling step with a sampling magnification of 0.6, a side length of the image may be reduced to 0.6 times the original, and an aspect ratio of the image remains unchanged.

In an example, the down-sampling processing path may include a Bicubic algorithm-based sampling step, a Bilinear algorithm-based sampling step, and a Lanczos algorithm-based sampling step. Moreover, the configuration of the sampling magnifications and sampling methods in the three sampling steps is shown in Table 1.

TABLE 1

| Step | Sampling magnification | Sampling method |
|---|---|---|
| 1 | 0.5 | Bicubic |
| 2 | 0.5 | Bilinear |
| 3 | 0.25 | Lanczos |

In this configuration, the down-sampling processing path is that in the first sampling step, a Bicubic method is adopted for sampling by 0.5 times; in the second sampling step, a Bilinear method is adopted for sampling by 0.5 times; and in the third sampling step, a Lanczos method is adopted for sampling by 0.25 times.

Optionally, the sampling method used in each of the sampling steps in the down-sampling processing path may be any one of Bicubic, Bilinear, and Lanczos, or may be other algorithms known in the art that can perform down-sampling. Moreover, each of the sampling steps may adopt the same sampling method, or may adopt different down-sampling methods.

The resolution of the first original image can be reduced through the down-sampling processing in the embodiments of the present disclosure, to acquire a first degraded image with the same image quality as the first original image and with a lower resolution than the first original image. That is, the first degraded image is a high-quality and low-resolution image.

Optionally, in the Gaussian blurring processing, the values of the Gaussian kernel size, the horizontal variance, and the vertical variance may be determined according to the following method.

A parameter is randomly selected from a preset Gaussian kernel parameter range, a preset horizontal variance range, and a preset vertical variance range, respectively, as the Gaussian kernel size, the horizontal variance, and the vertical variance.

The Gaussian kernel parameter range, the horizontal variance range, and the vertical variance range may be determined according to actual needs or empirical values. For example, the Gaussian parameter range may be [5, 7, 9, 11, 13, . . . , 31]. The random selection method can keep a certain difference in the Gaussian blurring of the first degraded image acquired after a plurality of processing, and when the first degraded image is used as a training sample, the diversity of the training samples can be maintained.

Through the Gaussian blurring processing in the embodiments of the present disclosure, a Gaussian blur can be added to the high-quality and low-resolution image after the down-sampling processing to acquire a first degraded image. The resolution of the first degraded image is the same as the resolution of the high-quality and low-resolution image after the down-sampling processing.

Optionally, still referring to FIG. 2, the method for processing the image according to the embodiment of the present disclosure further includes the following step.

In S203, a second degraded image is acquired by performing noise processing on the first degraded image according to a configured noise parameter.

The noise processing may include Gaussian noise processing, Poisson noise processing, multiplicative noise processing, and salt and pepper noise processing. Assuming that the noise processing is Gaussian noise processing, the noise parameter may be a Gaussian noise parameter. Correspondingly, S203 may be acquiring a second degraded image by performing Gaussian noise processing on the first degraded image according to a configured Gaussian noise parameter. The Gaussian noise parameter may include at least one of a mean and a standard deviation.

Optionally, the mean and standard deviation in the Gaussian noise parameter may be randomly selected based on a preset average range and a standard deviation range, respectively, and the selection methods are as follows:

$$\text{mean=normal}(\text{ave}_{mean}, \text{var}_{mean}) \quad \text{Expression (1)}$$

$$\text{std=normal}(\text{ave}_{std}, \text{var}_{std}) \quad \text{Expression (2)}$$

In expressions (1) and (2), mean represents the mean in the Gaussian noise parameter, and std represents the standard deviation in the Gaussian noise parameter. $\text{ave}_{mean}$ represents a mean of values within a preset mean range, $\text{var}_{mean}$ represents a variance of the values within the preset mean range, $\text{ave}_{std}$ represents a mean of values within a preset standard deviation range, and $\text{var}_{std}$ represents a variance of the values in the preset standard deviation range. normal( ) represents a normal distribution function, normal($\text{ave}_{mean}$, $\text{var}_{mean}$) represents returning to one of a set of numbers that obeys the normal distribution of the mean $\text{ave}_{mean}$ and the variance $\text{var}_{mean}$, and normal($\text{ave}_{std}$, $\text{var}_{std}$) represents returning to one of a set of numbers that obeys the normal distribution of the mean $\text{ave}_{std}$ and the variance $\text{var}_{std}$.

Through the noise processing in the embodiments of the present disclosure, noise (that is, Gaussian noise) can be added to the first degraded image to acquire a second degraded image. The resolution of the second degraded image is the same as the resolution of the first degraded image.

The Gaussian noise parameter is determined by the above random selection method, such that the Gaussian noise of the acquired second degraded image can maintain a certain difference, and when the second degraded image is used as a training sample, the diversity of the training samples can be maintained.

Optionally, still referring to FIG. 2, the method for processing the image according to the embodiment of the present disclosure further includes the following step.

In S204, a third degraded image is acquired by performing zoom blurring processing on the second degraded image according to a configured zoom blurring processing algorithm.

The zoom blurring processing algorithm is also referred to as a zoom blurring processing path, and the blurring processing path may include a plurality of sampling steps. In addition, a sampling magnification of each of the sampling steps in the zoom blurring processing path is within a second magnification range.

Optionally, the second magnification range may be determined according to actual requirements or empirical values, and an upper limit of the second magnification range may be greater than 1. For example, the second magnification range may be set to a range greater than 0, or may be set to a range greater than 0 and not greater than 16.

Optionally, the zoom blurring processing path may include at least two of the following three sampling steps: a Bicubic algorithm-based sampling step, a Bilinear algorithm-based sampling step, and a Lanczos algorithm-based sampling step.

In an example, the zoom blurring processing path includes a Bicubic algorithm-based sampling step, a Bilinear algorithm-based sampling step, and a Lanczos algorithm-based sampling step. The configuration of the sampling magnifications and sampling methods in the three sampling steps are shown in Table 2.

TABLE 2

| Step | Sampling magnification | Sampling method |
| --- | --- | --- |
| 1 | 0.5 | Bicubic |
| 2 | 2 | Bilinear |
| 3 | 0.25 | Lanczos |

In this configuration, the zoom blurring processing path is that in the first sampling step, a Bicubic method is adopted for sampling by 0.5 times; in the second sampling step, a Bilinear method is adopted for sampling by 2 times; and in the third sampling step, a Lanczos method is adopted for sampling by 0.25 times.

Optionally, the sampling method used in each of the sampling steps in the zoom blurring processing path may be any one of Bicubic, Bilinear, and Lanczos, or may be any other algorithm known in the art that can perform the zoom blurring processing in the embodiments of the present disclosure. Moreover, each of the sampling steps may adopt the same sampling method, or may adopt different sampling methods.

Through the zoom blurring processing in the embodiments of the present disclosure, a zoom blur can be added to the second degraded image to acquire a third degraded image. The resolution of the third degraded image is the same as the resolution of the second degraded image.

Optionally, still referring to FIG. 2, the method for processing the image according to the embodiment of the present disclosure further includes the following step.

In S205, a fourth degraded image is acquired by performing compression noise processing on the third degraded image according to a configured compression noise parameter.

Optionally, the compression noise parameter includes a coding quality coefficient. Correspondingly, performing compression noise processing on the third degraded image according to the configured compression noise parameter includes performing image coding, such as JPEG coding, on pixels of the third degraded image according to the coding quality coefficient.

Optionally, the coding quality coefficient may be randomly selected based on a preset coefficient range.

In an optional implementation, the coding quality coefficient is determined by:

$$Q_{jpeg} = \text{normal}(\text{ave}_q, \text{var}_q) \quad \text{Expression (3)}$$

In Expression (3), $Q_{peg}$ represents the coding quality coefficient, $\text{ave}_q$ represents a mean of values within a preset coefficient range, $\text{var}_q$ represents a variance of the values within the preset coefficient range, $\text{normal}(\ )$ represents a normal distribution function, and $\text{normal}(\text{ave}_q, \text{var}_q)$ represents returning to one of a set of numbers that obeys the normal distribution of the mean $\text{ave}_q$ and the variance $\text{var}_q$.

The above coefficient range may be determined experimentally based on the shooting age, equipment, distribution, and conversion-and-saving process of the first original image.

Through the compression noise processing in the embodiments of the present disclosure, compression noise can be added to the third degraded image to acquire a fourth degraded image. The resolution of the fourth degraded image is the same as the resolution of the third degraded image.

It can be understood that the execution order of the above S202 to S205 may be adjusted according to the situation. For example, S203 may be executed before S202, S204 may be executed before S203, and S205 may be executed before S204. In addition, any of the above steps from S203 to S205 may be deleted according to the situation, for example, S204 may be deleted.

Figure 3:
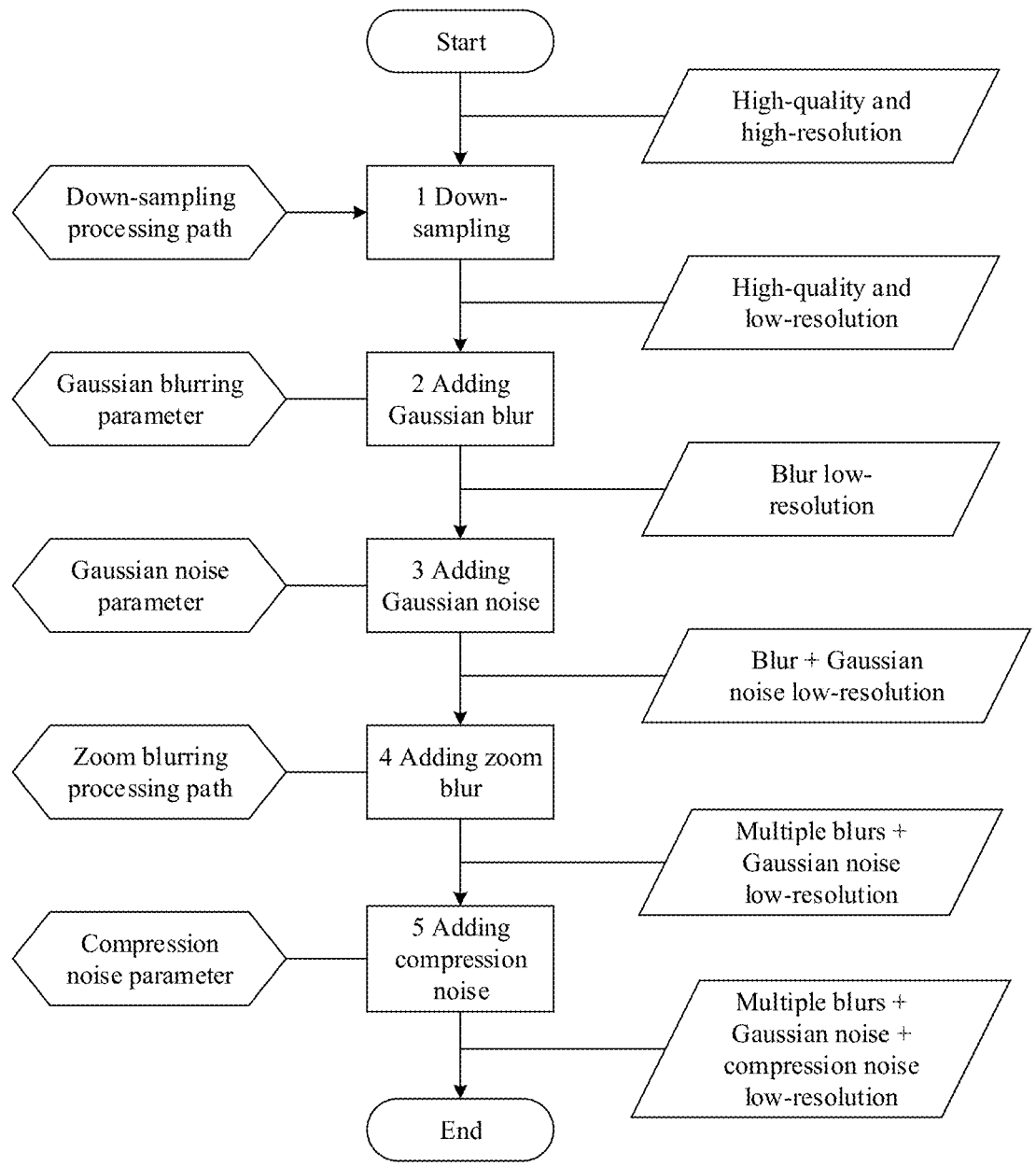
FIG. 3 is a schematic diagram of an expanded flow of an optional implementation of a method for processing an image according to an embodiment of the present disclosure.

An expanded flow of an optional implementation of the method for processing the image according to the embodiment of the present disclosure is shown in FIG. 3. Referring to FIG. 3, the device for processing the image may perform the following processing sequentially on the first original image as input (that is, the high-quality and high-resolution image).

1. Down-sampling processing is performed on the first original image based on the down-sampling processing path to acquire a high-quality and low-resolution image.

2. Gaussian blur is added to the high-quality and low-resolution image through Gaussian blurring processing based on the Gaussian blurring parameter to acquire a blurred low-resolution image (that is, the first degraded image).

3. Gaussian noise is added to the low-resolution image with blur added based on the Gaussian noise parameter through Gaussian noise processing to acquire a low-resolution image (that is, the second degraded image) with blur added and Gaussian noise.

4. Zoom blurring is added to the low-resolution image with blur added and Gaussian noise based on the zoom blurring processing path through zoom blurring processing to acquire a low-resolution image added with a plurality of blurs (including Gaussian blur and zoom blur) and Gaussian noise (that is, the third degraded image).

5. Compression noise is added to the low-resolution image added with a plurality of blurs and Gaussian noise based on the compression noise parameter through compression noise processing to acquire and output a low-resolution image added with a plurality of blurs, Gaussian noise, and compression noise (that is, the fourth degraded image).

Figure 4:
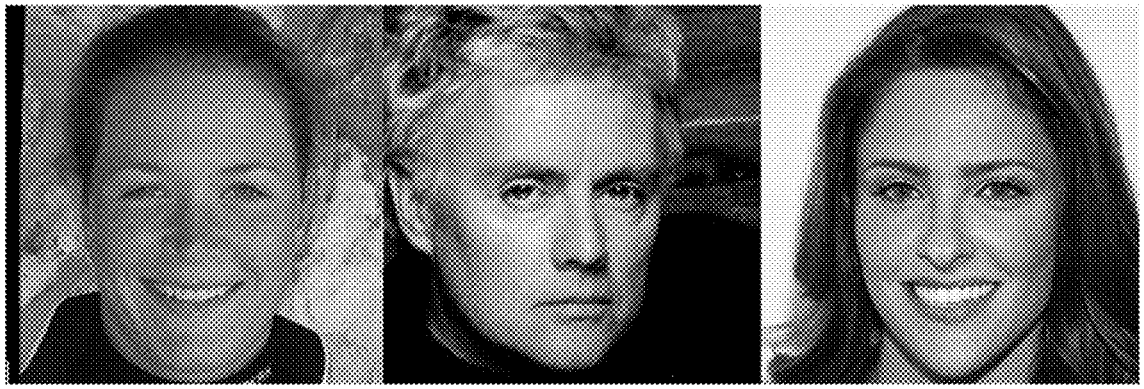
FIG. 4 is a schematic diagram of a first original image in an embodiment of the disclosure.
Figure 5:
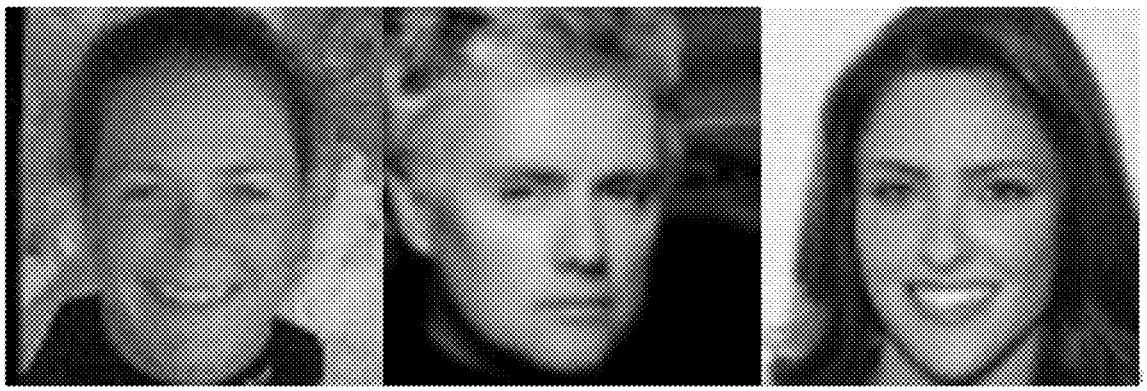
FIG. 5 is a schematic diagram of a degraded image acquired by processing the image shown in FIG. 4 according to the method for processing the image shown in FIG. 3.

In an example, the high-quality and high-resolution image as input is shown in FIG. 4, and after the processing shown in FIG. 3, the effect of the acquired fourth degraded image is shown in FIG. 5. It may be seen from FIG. 4 and FIG. 5 that the above image processing method according to the embodiment of the present disclosure can acquire an image with an effect approximating an old photo, and provide a good training sample for the restoration of the old photo.

Figure 6:
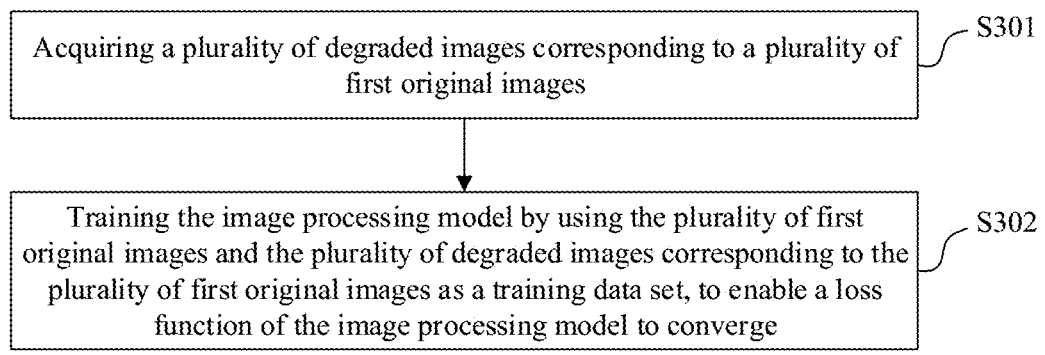
FIG. 6 is a schematic flowchart of a method for training an image processing model according to an embodiment of the present disclosure.

Based on the same inventive concept, an embodiment of the present disclosure provides a method for training an image processing model. As shown in FIG. 6, the method includes the following steps.

In S301, a plurality of degraded images corresponding to a plurality of first original images are acquired.

In S302, the image processing model is trained by using the plurality of first original images and the plurality of degraded images corresponding to the plurality of first original images as a training data set, to enable a loss function of the image processing model to converge.

It can be understood that the degraded image acquired in S301 is acquired after processing the first original image by the above method for processing the image according to the embodiment of the present disclosure. The degraded image may be any one of the above first degraded image, second degraded image, third degraded image, and fourth degraded image.

In summary, an embodiment of the present disclosure provides a method for training an image processing model, which can use a degraded image acquired by the above method for processing the image as a training sample. The image processing model applied in the old photo restoration technology is trained based on the training sample, and an image processing model with strong restoration can be obtained.

Figure 7:
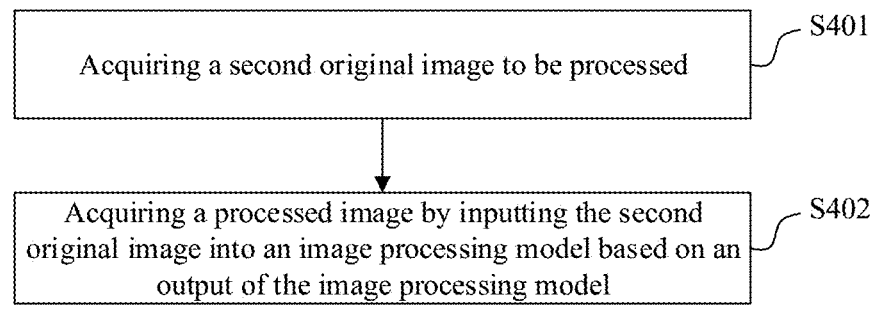
FIG. 7 is a schematic flowchart of another method for processing an image according to an embodiment of the present disclosure.

Based on the same inventive concept, an embodiment of the present disclosure provides another method for processing an image, which is applied to a device for processing an image. The device for processing the image may be a device with an image processing function, such as a computer or a server. As shown in FIG. 7, the method for processing the image includes the following steps.

In S401, a second original image to be processed is acquired.

Optionally, the second original image may be a low-quality and low-resolution image. Specifically, it may be an old photo of a specific era or may be a photo with low image quality and resolution (for example, both are lower than corresponding thresholds).

In S402, a processed image is acquired by inputting the second original image into an image processing model based on an output of the image processing model.

An image processing model is pre-stored in the device for processing the image, and the image processing model is acquired by training through the above method for training the image processing model according to the embodiment of the present disclosure. After the device for processing the image inputs the acquired second original image into the image processing model, a processed image output by the image processing model can be obtained, that is, a restored image.

Figure 8:
FIG. 8 is a schematic diagram of a second original image in an embodiment of the disclosure.
Figure 9:
FIG. 9 is a schematic diagram of an image acquired after processing the image shown in FIG. 8 according to the method for processing the image shown in FIG. 7.

Using the method for processing the image shown in FIG. 7, the second original image with low quality and low resolution can be restored to acquire an image with high quality and high resolution. In an example, for the second original image shown in FIG. 8, after being processed by the method for processing the image shown in FIG. 7, the acquired processed image is shown in FIG. 9. Compared to FIG. 8, the image quality and image resolution in FIG. 9 are greatly improved.

It can be understood that the device for processing the image applied to the method for processing the image shown in FIG. 7 and the device for processing the image applied to the method for processing the image shown in FIG. 1 or FIG.

2 may be the same device for processing an image, or may be different devices for processing an image.

By applying the method for processing the image and the method for training an image processing model according to the embodiments of the present disclosure, at least the following beneficial effects can be achieved.

In the embodiments of the present disclosure, a new photo (that is, a photo with high quality and high resolution) can be down-sampled, various degradation factors such as blur and noise can be added thereto to acquire a degraded image that approximates the effect of an old photo, a mathematical relationship between the old photo and the new photo can be established, and a good training sample can be provided for the application of machine learning in the old photo restoration technology. An image processing model with strong restoration can be acquired by training an image processing model applied to the old photo restoration technology based on the training sample, and when an old photo is restored by using the image processing model, the restoration efficiency is high and the restoration effect is good.

Based on the same inventive concept, an embodiment of the present disclosure provides an apparatus for processing an image, which is applied to a device for processing an image. The device for processing the image may be a device with an image processing function, such as a computer or a server.

Figure 10:
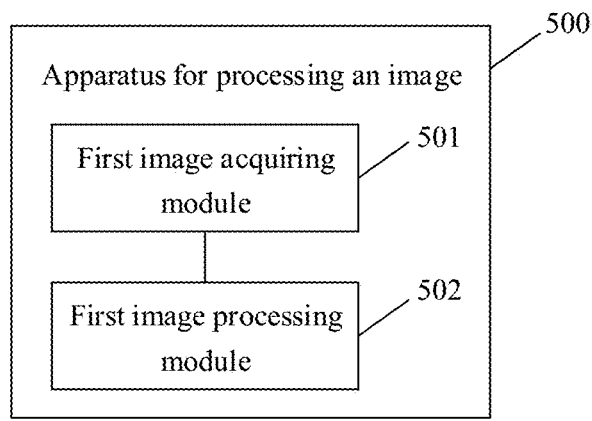
FIG. 10 is a schematic structural framework diagram of an apparatus for processing an image according to an embodiment of the present disclosure.

As shown in FIG. 10, the apparatus for processing the image 500 includes a first image acquiring module 501 and a first image processing module 502.

The first image acquiring module 501 is configured to acquire a first original image to be processed.

The first image processing module 502 is configured to acquire a degraded image by performing down-sampling processing and blurring processing on the first original image according to a configured down-sampling processing algorithm and a blurring parameter. The down-sampling processing algorithm includes a plurality of sampling steps.

For example, the first image processing module 502 may be configured to acquire a first degraded image by performing down-sampling processing and Gaussian blurring processing on the first original image sequentially according to a configured down-sampling processing path and Gaussian blurring parameters. The Gaussian blurring parameters include a Gaussian kernel size, a horizontal variance, and a vertical variance.

Optionally, the first image processing module 502 includes a down-sampling unit and a Gaussian blurring unit.

The down-sampling unit is configured to perform down-sampling processing on the first original image according to the configured down-sampling processing path. The Gaussian blurring unit is configured to perform Gaussian blurring processing on the image acquired after the down-sampling processing according to the configured Gaussian blurring parameters to acquire the first degraded image.

Optionally, the first image processing module 502 further includes a noise unit. The noise unit is configured to perform noise processing on the first original image according to a configured noise parameter.

For example, the noise unit may be a Gaussian noise unit. The Gaussian noise unit is configured to acquire a second degraded image by performing Gaussian noise processing on the first degraded image according to a configured Gaussian noise parameter. The Gaussian noise parameter includes at least one of a mean and a standard deviation.

Optionally, the first image processing module 502 further includes a zoom blurring unit. The zoom blurring unit may be configured to perform zoom blurring processing on the first original image according to a configured zoom blurring processing algorithm (also referred to as a zoom blurring processing path).

For example, the zoom blurring unit is configured to acquire a third degraded image by performing zoom blurring processing on the second degraded image according to the configured zoom blurring processing path. The zoom blurring processing path may include a plurality of sampling steps. A sampling magnification of each of the sampling steps in the down-sampling processing algorithm is within a first magnification range. A sampling magnification of each of the sampling steps in the zoom blurring processing path is within a second magnification range. An upper limit of the first magnification range may be less than or equal to 1. An upper limit of the second magnification range may be greater than 1.

Optionally, the first image processing module 502 further includes a compression noise unit. The compression noise unit may be configured to perform compression noise processing on the first original image according to a configured compression noise parameter. For example, the compression noise unit is configured to acquire a fourth degraded image by performing compression noise processing on the third degraded image according to the configured compression noise parameter.

Optionally, the compressing noise unit is specifically configured to perform image coding on pixels of the first original image (that is, the third degraded image) according to a coding quality coefficient.

Figure 11:
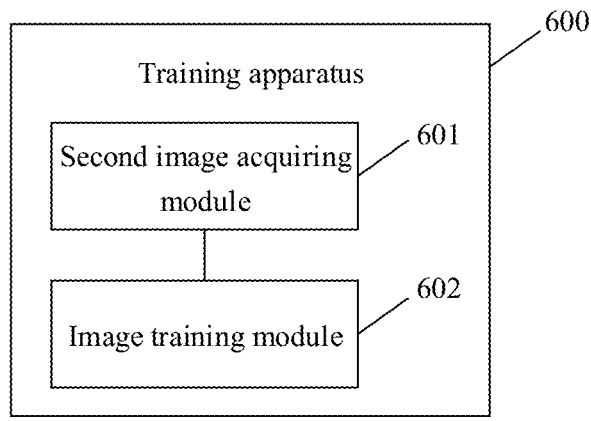
FIG. 11 is a schematic structural framework diagram of an apparatus for training an image processing model according to an embodiment of the present disclosure.

Based on the same inventive concept, an embodiment of the present disclosure provides an apparatus for training an image processing model. As shown in FIG. 11, the training apparatus 600 includes a second image acquiring module 601 and an image training module 602.

The second image acquiring module 601 is configured to acquire a plurality of degraded images corresponding to a plurality of first original images.

The image training module 602 is configured to train the image processing model by using the plurality of first original images and the plurality of degraded images corresponding to the plurality of first original images as a training data set, to enable a loss function of the image processing model to converge.

The degraded images are acquired after processing the first original images based on the method for processing the image according to the embodiment of the present disclosure.

Figure 12:
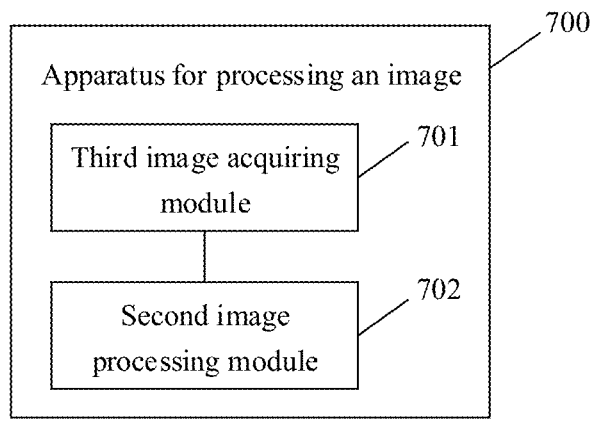
FIG. 12 is a schematic structural framework diagram of another apparatus for processing an image according to an embodiment of the present disclosure.

Based on the same inventive concept, an embodiment of the present disclosure provides an apparatus for processing an image, which is applied to a device for processing an image. The device for processing the image may be a device with an image processing function, such as a computer or a server. As shown in FIG. 12, the apparatus for processing the image 700 includes a third image acquiring module 701 and a second image processing module 702.

The second image acquiring module 701 is configured to acquire a second original image to be processed.

The second image processing module 702 is configured to acquire a processed image by inputting the second original image into an image processing model based on an output of the image processing model.

The image processing model is acquired by training with the method for training the image processing model according to the embodiment of the present disclosure.

The apparatuses according to the embodiments of the present disclosure can correspondingly execute the methods according to the embodiments of the present disclosure, and the implementation principles thereof are similar. For the content not shown in detail in the apparatuses, reference may be made to the above embodiments, which is not repeated here.

Based on the same inventive concept, an embodiment of the present disclosure provides a device for processing an image. The device for processing the image includes a memory and a processor. The memory and the processor are electrically connected.

The memory stores a computer program executed by the processor to perform at least one of the following methods according to the embodiments of the present disclosure: any one of the methods for processing the image and the method for training the image processing model.

Those skilled in the art can understand that the device for processing the image according to the embodiments of the present disclosure may be specially designed and manufactured for a desired purpose, or may also include known devices in general-purpose computers. These devices have computer programs stored therein that are selectively activated or reconfigured. Such a computer program may be stored in a device (that is, computer) readable medium or in any type of medium suitable for storing electronic instructions and coupled to a bus, respectively.

Figure 13:
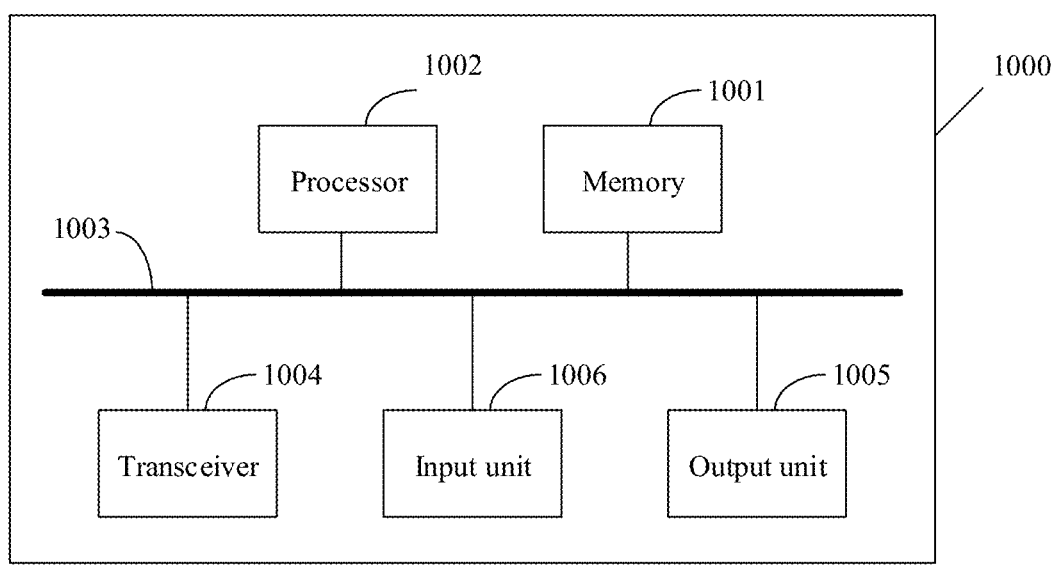
FIG. 13 is a schematic structural framework diagram of a device for processing an image according to an embodiment of the present disclosure.

The present disclosure provides a device for processing an image in an optional embodiment. As shown in FIG. 13, the device for processing the image 1000 includes a memory 1001 and a processor 1002. The memory 1001 and the processor 1002 are electrically connected, such as being connected via a bus 1003.

Optionally, the memory 1001 is configured to store application codes for executing the solution of the present disclosure, and the execution is controlled by the processor 1002. The processor 1002 is configured to execute the application codes stored in the memory 1001 to perform at least one of the following methods according to the embodiments of the present disclosure: any one of the methods for processing the image and the method for training the image processing model.

The memory 1001 may be a ROM (read-only memory) or other types of static storage devices that can store static information and instructions, may be a random access memory (RAM) or other types of dynamic storage devices that can store information and instructions, may also be an electrically erasable programmable read-only memory (EEPROM), a compact disc read-only memory (CD-ROM) or other optical disks storage, optical disc storage (including compact discs, laser discs, optical discs, digital versatile discs, Blu-ray discs, and the like), magnetic disk storage media or other magnetic storage devices, or any other medium that can carry or store desired program code in the form of instructions or data structures and can be accessed by a computer, which is not limited here.

The processor 1002 may be a central processing unit (CPU), a general-purpose processor, a data signal processor (DSP), an application-specific integrated circuit (ASIC), a field-programmable gate array (FPGA), or other programmable logic devices, transistor logic devices, hardware components, or any combination thereof. It may implement or execute various exemplary logical blocks, modules, and circuits described in connection with the present disclosure. The processor 1002 may also be a combination that implements computing functions, such as a combination of one or more microprocessors, a combination of a DSP and a microprocessor, and the like.

The bus 1003 may include a path to transfer information between the above components. The bus may be a peripheral component interconnect (PCI) bus or an extended industry standard architecture (EISA) bus. The bus may be divided into address bus, data bus, control bus, and so on. For ease of description, only one thick line is shown in FIG. 13, but it does not mean that there is only one bus or one type of bus.

Optionally, the device for processing the image 1000 may further include a transceiver 1004. The transceiver 1004 may be configured to receive and transmit signals. The transceiver 1004 may allow the device for processing the image 1000 to communicate with other devices in a wireless or wired fashion to exchange data. It should be noted that, in practice, the transceiver 1004 is not limited to one.

Optionally, the device for processing the image 1000 may further include an input unit 1005. The input unit 1005 may be configured to receive input numbers, characters, images, and/or sound information, or generate key signal inputs related to user settings and function control of the electronic device 1000. The input unit 1005 may include, but is not limited to, one or more of a touch screen, a physical keyboard, a function key (such as a volume control key, a switch key, and the like), a trackball, a mouse, a joystick, a camera, a pickup, and the like.

Optionally, the device for processing the image 1000 may further include an output unit 1006. The output unit 1006 may be configured to output or display information processed by the processor 1002. The output unit 1006 may include, but is not limited to, one or more of a display device, a speaker, a vibration device, and the like.

Although FIG. 13 shows the device for processing the image 1000 having various apparatuses, it should be understood that not all of the illustrated apparatuses are required to be implemented or provided. More or fewer apparatuses may alternatively be implemented or provided.

The device for processing the image according to the embodiments of the present disclosure has the same inventive concept as the above embodiments. For the content not shown in detail in the image processing device, reference may be made to the above embodiments, which is not repeated here.

Based on the same inventive concept, an embodiment of the present disclosure provides a computer-readable storage medium on which a computer program is stored. The computer program, when being executed by a processor, performs at least one of the following methods: any one of the methods for processing the image and the method for training an image processing model.

The computer-readable medium includes, but is not limited to, any type of disk (including floppy disk, hard disk, CD-ROM, CD-ROM, and magneto-optical disk), ROM, RAM, erasable programmable read-only memory (EPROM), EEPROM, flash memory, magnetic card, or optical card. That is, the readable medium includes any medium that stores or transmits information in a form that may be read by a device (such as a computer).

The computer-readable storage medium according to the embodiments of the present disclosure has the same inventive concept as the above embodiments. For the content not shown in detail in the computer-readable storage medium, reference may be made to the above embodiments, which is not repeated here.

Those skilled in the art will understand that various operations, methods, steps, measures, and solutions discussed in the present disclosure may be alternated, modified, combined, or deleted. Further, other steps, measures, and solutions in various operations, methods, and processes that have been discussed in the present disclosure may also be alternated, modified, rearranged, decomposed, combined, or deleted. Further, steps, measures, and solutions in the prior art with various operations, methods, and processes disclosed in the present disclosure may also be alternated, modified, rearranged, decomposed, combined, or deleted.

In the description of the present disclosure, it should be understood that the terms "first" and "second" are only used for descriptive purposes, and cannot be interpreted as indicating or implying relative importance or implicitly indicating the indicated technical features quantity. Thus, a feature defined as "first" or "second" may expressly or implicitly include one or more of that feature. In the description of the present disclosure, unless stated otherwise, "a plurality of" means two or more.

It should be understood that although various steps in the flowchart of the accompanying drawings are sequentially shown in the order indicated by the arrows, these steps are not necessarily executed sequentially in the order indicated by the arrows. Unless explicitly stated herein, the execution of these steps is not strictly limited to the order and may be performed in other orders. Moreover, at least a part of the steps in the flowcharts of the accompanying drawings may include a plurality of sub-steps or a plurality of stages, and these sub-steps or stages are not necessarily executed at the same time, but may be executed at different times, and the execution sequence does not have to be performed sequentially, but may be performed alternately or alternatively with other steps or at least a portion of sub-steps or stages of other steps.

Described above are merely some embodiments of the present disclosure. It should be noted that for those skilled in the art, without departing from the principles of the present disclosure, several improvements and modifications can also be made, and these improvements and modifications should also be regarded as the protection scope of the present disclosure.

What is claimed is:

1. A method for processing an image, comprising:
   acquiring a first original image to be processed; and
   acquiring a degraded image by performing down-sampling processing and blurring processing on the first original image according to a configured down-sampling processing algorithm and a blurring parameter;
   wherein the down-sampling processing algorithm comprises a plurality of sampling steps,
   the first original image and the degraded image are used as training samples to train an image processing model applied to an old photo restoration technology, image quality of the degraded image corresponds to an effect of an old photo, and image quality of the first original image to be processed corresponds to an effect of a restored old photo,
   the method further comprising:
   performing compression noise processing on the first original image according to a configured compression noise parameter,
   wherein the compression noise parameter comprises a coding quality coefficient; and
   said performing compression noise processing on the first original image according to the configured compression noise parameter comprises:
   performing image coding on pixels of the first original image according to the coding quality coefficient,
   wherein the coding quality coefficient is determined by:

$Q_{jepg}=\text{normal}(\text{ave}_q,\text{var}_q)$, wherein $Q_{jepg}$ represents the coding quality coefficient, $\text{ave}_q$ represents a mean of values within a preset coefficient range, $\text{var}_q$ represents a variance of the values within the preset coefficient range, normal( ) represents a normal distribution function, and $\text{normal}(\text{ave}_q,\text{var}_q)$ represents returning to one of a set of numbers that obeys the normal distribution of the mean $\text{ave}_q$ and the variance $\text{var}_q$.

2. The method according to claim 1, wherein the blurring processing is Gaussian blurring processing, and the blurring parameter comprises at least one of a Gaussian kernel size, a horizontal variance, and a vertical variance.

3. The method according to claim 2, wherein said acquiring a degraded image by performing down-sampling processing and blurring processing on the first original image comprises:
   acquiring a first degraded image by performing down-sampling processing and blurring processing on the first original image sequentially; and
   the method further comprises:
   acquiring a second degraded image by performing Gaussian noise processing on the first degraded image according to a configured Gaussian noise parameter, wherein the Gaussian noise parameter comprise at least one of a mean and a standard deviation;
   acquiring a third degraded image by performing zoom blurring processing on the second degraded image according to a configured zoom blurring processing algorithm; and
   acquiring a fourth degraded image by performing compression noise processing on the third degraded image according to a coding quality coefficient, wherein the coding quality coefficient is determined by:

$Q_{jepg}=\text{normal}(\text{ave}_q,\text{var}_q)$, wherein $Q_{jepg}$ represents the coding quality coefficient, $\text{ave}_q$ represents a mean of values within a preset coefficient range, $\text{var}_q$ represents a variance of the values within the preset coefficient range, normal( ) represents a normal distribution function, and $\text{normal}(\text{ave}_q,\text{var}_q)$ represents returning to one of a set of numbers that obeys the normal distribution of the mean $\text{ave}_q$ and the variance $\text{var}_g$;
   wherein each of the down-sampling processing algorithm and the zoom blurring processing algorithm comprises the following three sampling steps: a bicubic interpolation algorithm-based sampling step, a bilinear interpolation algorithm-based sampling step, and a Lanczos algorithm-based sampling step, wherein a sampling magnification of each of the sampling steps in the down-sampling processing algorithm is within a first magnification range, a sampling magnification of each of the sampling steps in the zoom blurring processing path is within a second magnification range, an upper limit of the first magnification range is less than or equal to 1, and an upper limit of the second magnification range is greater than 1.

4. The method according to claim 1, wherein the down-sampling processing algorithm comprises at least two of a bicubic interpolation algorithm-based sampling step, a bilinear interpolation algorithm-based sampling step, and a Lanczos algorithm-based sampling step.

5. The method according to claim 1, wherein a sampling magnification of each of the sampling steps in the down-sampling processing algorithm is within a first magnification range, and an upper limit of the first magnification range is less than or equal to 1.

6. The method according to claim 5, wherein in the down-sampling processing algorithm, a sampling magnification of a bicubic interpolation algorithm-based sampling step is 0.5, a sampling magnification of a bilinear interpolation algorithm-based sampling step is 0.5, and a sampling magnification of a Lanczos algorithm-based sampling step is 0.25.

7. The method according to claim 1, further comprising:
performing noise processing on the first original image according to a configured noise parameter.

8. The method according to claim 7, wherein the noise processing is Gaussian noise processing, and the noise parameter comprises at least one of a mean and a standard deviation.

9. The method according to claim 1, further comprising:
performing zoom blurring processing on the first original image according to a configured zoom blurring processing algorithm;
wherein the zoom blurring processing algorithm comprises a plurality of sampling steps, and a sampling magnification of each of the sampling steps in the zoom blurring processing algorithm is within a second magnification range, and an upper limit of the second magnification range is greater than 1.

10. The method according to claim 9, wherein the zoom blurring processing algorithm comprises at least two of a bicubic interpolation algorithm-based sampling step, a bilinear interpolation algorithm-based sampling step, and a Lanczos algorithm-based sampling step.

11. The method according to claim 9, wherein in the zoom blurring processing algorithm, a sampling magnification of a bicubic interpolation algorithm-based sampling step is 0.5, a sampling magnification of a bilinear interpolation algorithm-based sampling step is 2, and a sampling magnification of a Lanczos algorithm-based sampling step is 0.25.

12. A method for training an image processing model, comprising:
training the image processing model by using a plurality of first original images and a plurality of degraded images corresponding to the plurality of first original images as a training data set, to enable a loss function of the image processing model to converge;
wherein the degraded images are acquired by processing the first original images according to the method for processing the image as defined in claim 1.

13. A method for processing an image, comprising:
acquiring a second original image to be processed; and
acquiring a processed image output by an image processing model by inputting the second original image into the image processing model;
wherein the image processing model is acquired by training according to the method for training the image processing model as defined in claim 12.

14. A device for processing an image, comprising:
a memory; and
a processor electrically connected to the memory, wherein the memory stores a computer program executable by the processor to perform the method for processing the image as defined in claim 13.

15. A device for processing an image, comprising:
a memory; and
a processor electrically connected to the memory, wherein the memory stores a computer program executable by the processor to perform the method for training the image processing model as defined in claim 12.

16. A device for processing an image, comprising:
a memory; and
a processor electrically connected to the memory, wherein the memory stores a computer program executable by the processor to perform the method for processing the image as defined in claim 1.

17. A non-transitory computer-readable storage medium storing a computer program, wherein the computer program, when executed by a processor, performs the method for processing the image as defined in claim 1.

\* \* \* \* \*